March 15, 1932.  C. B. GRAY  1,849,829
METAL CUTTING MACHINE
Filed Jan. 21, 1928   2 Sheets-Sheet 1
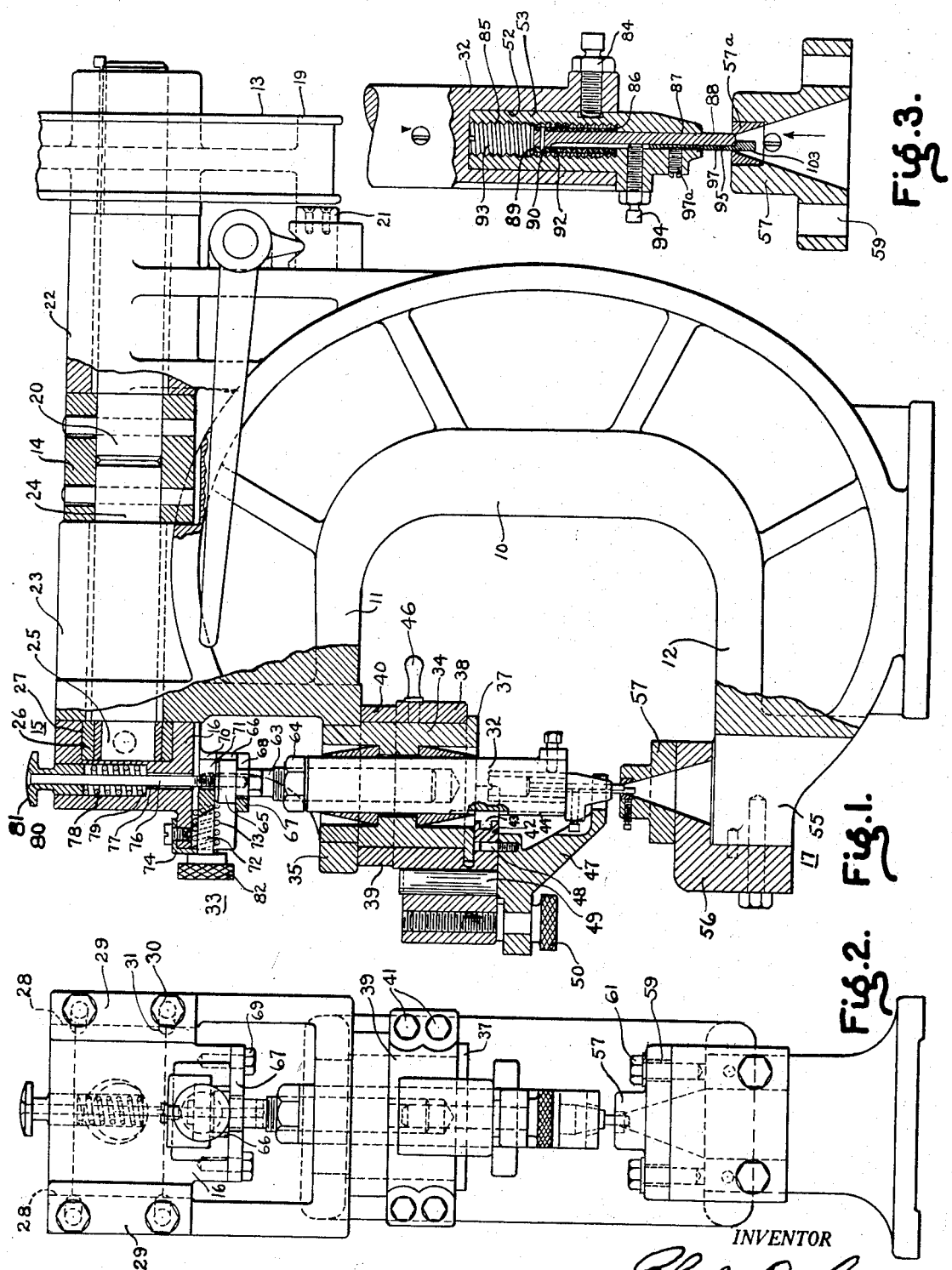
INVENTOR
Charles B. Gray

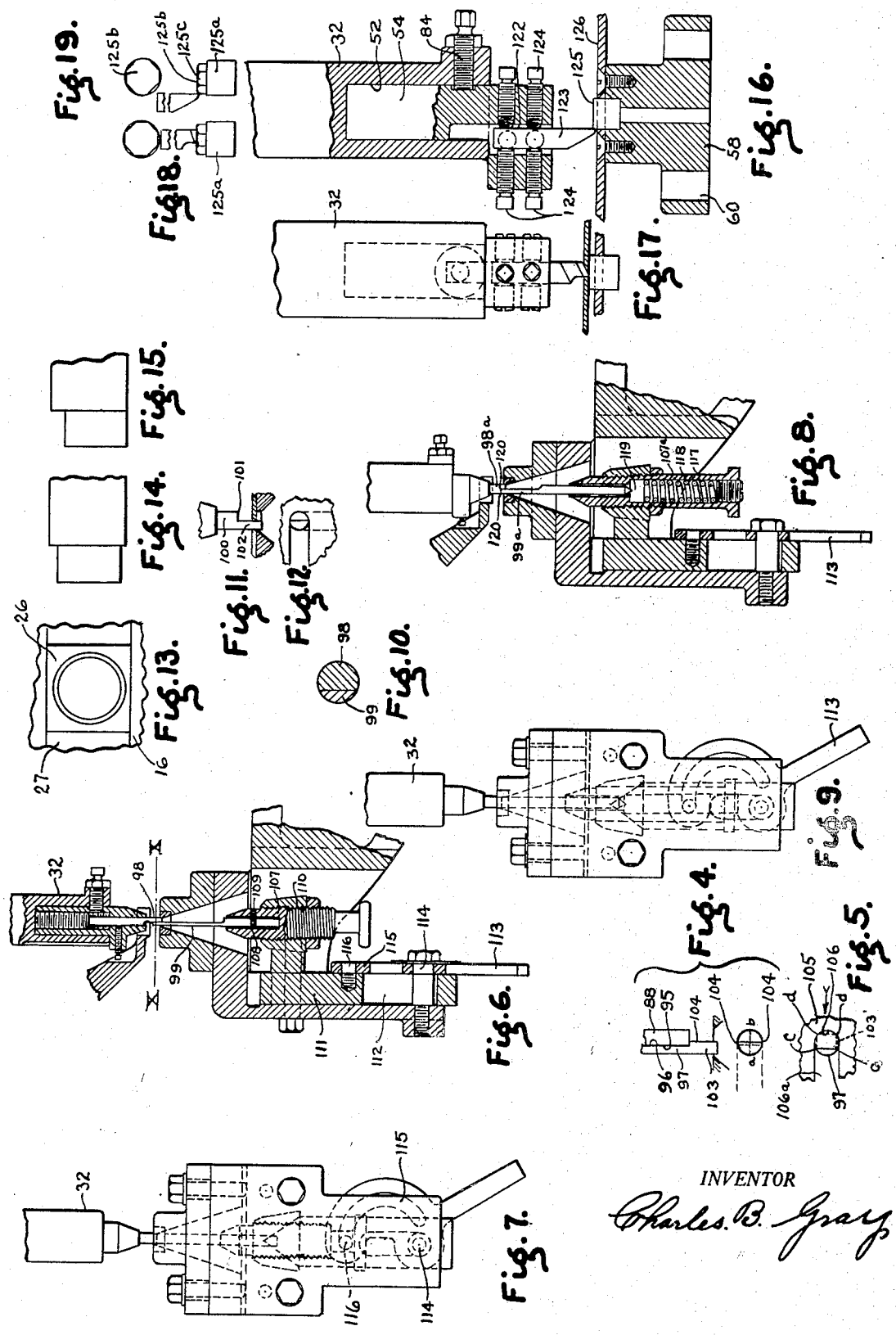

Patented Mar. 15, 1932

1,849,829

UNITED STATES PATENT OFFICE

CHARLES B. GRAY, OF MILLBOURNE, PENNSYLVANIA

METAL CUTTING MACHINE

Application filed January 21, 1928. Serial No. 248,449.

My invention relates to machines for cutting or slotting sheet or plate material.

In the metal working art, machines of the nibbling and shear type are already known. The nibbling type of machine employs a punch and pilot member cooperating so that a metallic sheet or plate may be slotted, the pilot member serving to limit the increment of feed. In the shear type of machine, a reciprocating shear tool may cooperate with a shear or block in order to effect a shear cut in sheet or plate material. In many situations in the art, machines of both types are necessary to execute certain classes of work. It is, therefore, an object of my invention to provide a machine with changeable tool and tool operating means such that a single machine may be readily changed from one type to the other.

A further object of my invention is to provide a cutting machine embodying a longitudinally-adjustable ram and a movable cutter which is adjustable longitudinally with respect to the ram in order that the movable cutter may be related as desired with respect to the fixed cutter.

A further object of my invention is to provide a metal cutting machine with means for angularly adjusting the tool.

A further object of my invention is to provide a combined machine of the character referred to with improved gaging mechanism.

These and other objects are effected by my invention, as will be apparent from the following description and claims taken in connection with the accompanying drawings, forming a part of this application, in which:

Fig. 1 is a side elevation of cutting machine with parts shown in section;

Fig. 2 is a front elevation of apparatus shown in Fig. 1;

Fig. 3 is a detail sectional view of punch apparatus;

Fig. 4 is a diagrammatic view illustrating principles of operation of the punch shown in Figs. 1, 2 and 3;

Fig. 5 is a diagrammatic view further illustrating principles of operation involved in Figs. 1, 2, and 3;

Figs. 6 and 7 are detail views showing a modified form of punch and pilot member;

Figs. 8 and 9 are similar to Figs. 6 and 7 except that a modified form of pilot member holder is provided;

Fig. 10 is a sectional view taken along the line X—X of Fig. 6;

Figs. 11 and 12 are detail views showing a further modified form of punch;

Figs. 13 to 15, inclusive, are detail views of the eccentric mechanism;

Figs. 16 and 17 are detail views showing how the machine of Figs. 1 and 2 may be converted into a shear; and, Figs. 18 and 19 are detail views showing a polygonal shear block.

In accordance with my present invention, I provide a cutting machine which is capable of being operated as a nibbling machine or as a shear. The machine includes a frame 10 having an upper jaw 11 and a lower jaw 12. The upper jaw carries a driving member 13 connected by a connectible coupling 14 to means, at 15, for converting rotary motion of the driving member 13 into reciprocatory motion of the slide 16 to which a suitable tool may be connected. The lower jaw 12 is provided with means, at 17, to receive a suitable die or block. The motion converting means is in part removable so that other part or parts may be substituted in order to change the throw or stroke, thereby making the machine adaptable for operating upon material of varying thickness without having the reciprocatory cutter go through the stock too far on the cutting stroke. Another feature of the invention is the provision of improved gaging means which is normally biased to maintain the tool in operative position and which may be manually released to secure retraction of the tool. A further feature of my invention is to provide improved tool means for use with the machine; first, a punch and pilot member capable of being operated to cut along a desired line with or without a templet; and, second, shear and block readily substitutable for the punch and the pilot member.

Additional features of my invention are means for angularly adjusting the movable cutting member; means for longitudinally adjusting the ram and for longitudinally adjusting the movable cutting member or tool with respect to the fixed cutting member; and improved gag mechanism permitting of the movable cutting member being readily raised.

Referring now to the machine more in detail, the driving means preferably takes the form of a pulley 19 connected to the shaft member 20, the pulley having associated therewith a brake 21. The frame is provided with alined bearings 22 and 23, the shaft 20 fitting the bearing 22. A shaft section 24 fits the bearing 23, and, at one end, it is connected, by the coupling 14, to the shaft member 20, while, at its other end, it is provided with an eccentric portion 25.

The eccentric portion 25 is journaled in a block 26 slidable in a transverse groove 27 provided in the slide 16, the latter being retained for reciprocatory movement by suitable parallel guides 28 and retaining plates 29 held in place by screws 30 preferably fitting oblong slots 31 in the retaining plates, the latter structure providing for the ready removal and insertion of eccentrics in changing the throw. It will, therefore, be apparent that, with the apparatus referred to, rotary movement of the driving member 13 is converted into reciprocatory movement of the slide 16, the amplitude of the latter movement depending upon the eccentricity of the accentric portion 25.

The throw or extent of reciprocation of the slide 16 may be varied by providing eccentrics 25 of the same size but varying degrees of eccentricity as shown either in Figs. 14 and 15. Change of eccentrics may be effected simply by removing the slide and disconnecting the coupling 14, after which a shaft section 24 may be removed and another inserted.

The slide 16 is connected to the ram 32 by gag mechanism, at 33, more particularly hereinafter referred to. The ram 32 is mounted in a guide 34 carried by a projection 35 of the frame and arranged below the guides 28. The guide 34 is provided with a lower flange 37; and, between the flanges 35 and 37, it is formed as a journal for the bearing portion 38 made preferably in two parts 39 and 40 held together by screws 41. The part 39 has a portion 42, which underhangs the flange and which is provided with a key 43 fitting the keyway 44 in the ram 32. A handle 46 is conected to the bearing portion 38, whereby the latter may be turned to turn the ram 32.

A stripper 47 is detachably connected to the bearing portion 38; and, for this purpose, the stripper is provided with pin or tenon means 48 and 49 fitting openings in the member 38 and with a screw 50 for connecting it to the bearing portion and for securing adjustment of the stripper suitably to the thickness of the stock. If the machine is used as a nibbler (Figs. 1 and 2), it is desirable to employ the stripper; however, where the machine is used as a shear (Figs. 16 and 17), the stripper may not be necessary, in which case it may be readily removed. By moving the handle 46, it will be apparent that the tool, as well as the stripper, may be turned in order to change the direction of cutting without turning the blank or in order to avoid obscuring vision by the stripper.

The ram 32 is provided with a socket 52 for a movable cutting member such as a holder 53 for a punch (Figs. 1 and 2), or a holder 54 for a movable cutting member such as a shear (Figs. 16 and 17). The lower jaw 12 has a bifurcated end portion to the furcations 55 of which is secured the seat member 56. If a punch is used (Figs. 1 and 2), a block 57 for a fixed cutter or die 57a is secured to the seat 56 and if a shear is used (Figs. 16 and 17), a block 58 for a fixed cutting member or shear block 125 is used. The blocks 57 and 58 are provided with openings 59 and 60, respectively, with which cooperate screws 61 in order that either type of blocks may be secured to the seat 56.

Whether the machine be used as a nibbler or as a shear, it is desirable that the gag mechanism, at 33, be employed to permit of ready retraction of the tool. Referring now to this mechanism more in detail, a stem 63 is threaded interiorly to the upper end of the ram 32 and a lock-nut 64 cooperates therewith to hold it in adjusted position. The stem 63 has a head 65 located in a recess 66 in the slide 16. A bar 67 has a U-shaped slot 68 engaging about the stem 63 and underneath the head 65, the bar being secured to the lower end of the slide by screws 69. Above the recess 66, the slide 16 is provided with a guideway 70 for a gag member 71 having a forwardly projecting stem 72 about which there is disposed a compression spring 73 whose outer end cooperates with a stop 74 to urge the gag member 71 into the space immediately above the head 65. With the gag member in, upward movement of the slide 16 is transmitted through the bar 67 to the underface of the head 65 and downward movement of the slide is communicated by the gag member to the top surface of the head. If the gag member 71 is pulled out to clear the top surface of the head 66, there is sufficient clearance for retraction of the tool from the die and stock, the arrangement preferably being such that the stem 63 is retracted so that the top of the guideway 70 pulled up against the top of the guideway 70 as soon as the gag member 71 is disengaged from the head 65. In the drawings, I show a rod 76 connected to the upper end of the stem 63 and arranged in the counterbored opening 77 in the slide 16. A compression spring 78 is arranged between a shoulder 79, provided by the counterbored opening, and an abutment 80 secured to the rod 76, the latter having an upper button 81. The gag member 71 is provided with a pull-out button 82. Hence it will be seen that, as soon as the gag member 71 is pulled out, the spring 78 serves to retract the stem 63 and the ram 32 connected thereto. On the other hand, by pushing down on the button 81, the stem and the ram are pushed down; and, as soon as the top surface of the head 65 clears the lower surface of the gag member 71, the latter moves in above the head due to the pressure of the spring 73.

Referring now to the adaptation of my machine for nibbling purposes, in Figs. 1, 2 and 3, I show the holder 53 fitting the socket 52 and held therein by the screw 84. The holder has an axial counterbored opening having an upper threaded portion 85 of larger diameter separated by a shoulder 86 from the lower portion 87 of the smaller diameter. A movable cutting member or punch 88 extends through and below the lower end of the lower portion 87 and into the portion 85 of the larger diameter. Abutment means, for example, a collar 89 and a connecting pin 90, are provided at the upper end of the punch. Adjustable spacing means, for example, packing washers 92, are arranged between the abutment means and the shoulder 86 and a follower 93 is threaded in the upper portion 85 and engages the upper end of the punch 88. Hence, it will be seen that the punch 88 may be adjusted to extend a desired distance below the holder 53, by suitably adjusting the spacing means below the punch abutment means 89 and screwing down the follower 93 to place the spacing means under compression. The pin 90 is subject to stress incident to retracting the tool from the stock, while the compressive stress incident to cutting is borne by the follower 93. A screw 94 is carried in the holder 53 for gripping the punch 88. With this arrangement, it will be apparent that a punch may be repeatedly dressed, the decrease in length being taken care of by shortening the spacing means, for example, by removing washers 92, moving the punch down, and screwing down the follower 93.

After the punch tool is secured in adjusted position with respect to the ram 32, finer adjustment of the tool relatively to the die may be made by adjusting the ram axially of the threaded stem 63, the lock nut 64 being loosened before making the adjustment and being tightened thereafter. The tool connecting means may be of such a character, Fig. 3, that close adjustment of the tool with respect to the die is not always possible. Therefore, an approximate adjustment is made by the tool connecting means, and the fined and final adjustment is then made by turning the threaded stem 63 to secure axial movement of the ram to bring the punch into proper relation with respect to the die. As the stem 63 has a swivel connection with the slide 16, it may be turned relatively to the latter; and, as the ram is restrained from turning by the means for angularly adjusting it, turning of the threaded stem results in axial adjustment of the ram. The portion of the stem between the ram 32 and the slide 16 is exposed so that the wrench-engaging portion thereof immediately below the swivel connection is accessible for engagement by a wrench.

Referring now to the movable cutting member or punch 88 shown in Figs. 3 and 4, such punch is provided with a flattened rear face 95 with which there cooperates in overlapping relation the forward face 96 of the pilot member 97. The pilot member 97 is preferably complementary to the punch 88 so that the two provide a circular cross section in order that turns may be readily made without lateral cutting; however, so far as this result is concerned, it is only necessary that the maximum dimension of the punch and the pilot member in the instantaneous direction of feed, distance "$ab$" Fig. 4, should not be greater than the maximum dimension of the punch transverse to the instantaneous direction of feed. The pilot member 97 is secured in position relatively to the punch 98 and the holder 53 by a screw 97a.

It is characteristic of my invention that the pilot member has two guide edges or portions arranged to cooperate with the forward end of a slot being cut in order to guide and to hold the blank against shifting sidewise, thereby rendering a templet unnecessary in following a desired line. Also, the pilot member does not have to be operated positively and independently of the punch. This feature may be taken care of in various ways; in Figs. 1 to 4, inclusive, the pilot member 97 overlaps the punch 88 longitudinally and is fixed relatively thereto; in Figs. 6 and 7, the punch 98 is movable relatively to the pilot members 99; in Figs. 8 and 9, the punch and the pilot member overlap longitudinally, as in Figs. 6 and 7, but both move together; and, in Figs. 11 and 12, there is shown a combined punch and pilot member 100 having a punch portion 101 and a pilot portion 102. It is characteristic of these forms that, when the punch is retracted, the pilot member bridges the space between the punch face and the die and serves to limit the increment of feed.

With the form of punch shown in Figs. 1 to 4, inclusive, the punch may have adequate strength since it extends rearwardly of the center line. Since the width of the faces 95 and 96 is substantially less than the punch diameter, the increment of feed would be so great that the slot would have scalloped sides. To avoid this, the pilot member 97 has a pilot portion 103 which underlaps the punch face of the punch 88, the pilot member having guide portions or edges 104 for cooperation with the concave end of a slot in a blank to limit the increment of feed. The increment of feed depends upon the distance of the points or edges 104 from the forward concave end of a slot considered along lines parallel to the slot sides and immediately after a punching stroke.

For example, referring to Fig. 5, assume a blank 105 to have the instantaneous direction of feed indicated by the arrow. Assume that the guide edges 104 are at positions $c$. Draw lines parallel to the direction of feed and passing through the points $c$. Such lines will intersect the forward concave end 106 of the slot 106a at points $d$. The distance $cd$ represents the increment of feed. This distance may be shortened by having the distance between the guide edges 104 almost equal to the punch diameter, or, as shown in Figs. 1 to 4, inclusive, this distance may be shortened by having the pilot portion 103 underlap the punch, for, in Fig. 5, if the guide points $c$ are moved along the lines $cd$ toward $d$ the increments of feed are correspondingly reduced. Hence, in the form shown in Figs. 1–4, the punch is strong in that the latter extends rearwardly of the center line while, at the same time, the increment of feed may be controlled by suitably designing the underlapping pilot portion.

In Figs. 6, 7, 8 and 9, the pilot members 99 and 99ª are carried by the lower arm 12 of the frame. In Figs. 6 and 7, the pilot member 99 is swivelled to the holder 107, the pilot member having a lower portion provided with an annular channel 108 with which engages a screw 109. Hence, it will be seen that, if the punch 98 is turned, the pilot member, due to the longitudinal overlapping relation with respect to the punch, is also turned.

The holder 107 is threaded, as indicated at 110, with respect to the slide member 111. By turning the holder 107, suitable longitudinal adjustment of the pilot member 99 may be made.

The pilot member 99 may be disengaged or moved to inoperative position by suitable manually controlled means. To this end, the slide member 111 fits a guide 112 to which a lever 113 is pivoted at 114, the lever having a cam slot 115 engaging a pin 116 on the slide 111. If the lever 113 is raised, the pilot member 99 will be lowered and vice versa.

The construction shown in Figs. 8 and 9 is like that of Figs. 6 and 7 except that the holder 107ª is provided with an axial opening 117 having a spring 118 therein. An abutment 119 is carried by the upper end of the spring and it constitutes a support for the lower end of the pilot member 99ª. The punch 98ª differs slightly from the punch 98 in Fig. 6 in that it is cut away square as indicated at 120 to receive the upper end of the pilot member 99ª. With this form, the pilot member moves with the punch. Disengagement of the pilot member 99ª may be effected, as in Fig. 6, by operation of the handle 113.

While in the preceding views, I show punches and pilot members defining substantially circular sections, it will be understood that these parts might define sections of other shapes. The circular shape is advantageous in cutting slots of small radius or slots having angle portions, as turns may be made without side gouging as would be the case where the section is oblong. While the pilot members are complementary with punch portions to define a circular outline, this is not absolutely necessary, for, so far as ease of turning without undue side cutting is concerned, it is sufficient if the diameter of the punch transverse of the direction of feed is greater than or equal to the minimum dimension of the punch and the pilot member in the direction of feed; however, as the pilot member is in the die 57a before punching begins, it is desirable that such pilot member have a section complementary to the punch section to form a circular figure of a size suitable for the die 57a so that the pilot member may guide the punch during the punching operation or at least prevent backward deflection of the punch.

Maximum resistance is encountered by the punch at the front. This tends to produce a condition of eccentric loading; and this condition is opposed due to the cooperation of the pilot member with respect to the die, that is, at least just before the punch reaches the work, the pilot member is fitting the die and due to this the pilot member serves to reinforce the punch in order to avoid backward deflection thereof due to the condition of loading. In this way, satisfactory operation under varied load conditions and the avoidance of jamming or breaking of the punch, the pilot member, and the die are avoided.

As shown in Figs. 16 and 17, the machine is readily changed from one of the nibbling type to one of the shear type, it being merely necessary to replace the nibbling tool holder 53 of Figs. 1, 2 and 3 with the shear holder 54 of Figs. 16 and 17, and to replace the die block 57 with the shear block 58.

As already pointed out, it is desirable that the stroke of the slide 16 shall be suitable to the thickness of the work. Any excess in stroke of the nibbling punch results in useless frictional losses; and, where the shear tool is used, the stroke should be accurately controlled for best operation. The shear tool should go only far enough to shear and no further. Variation in stroke may be readily effected by changing the eccentric for the slide 16, the machine being provided with a plurality of shaft members 24 having eccentric portions 25 of varying eccentricity. A shaft member 24 is readily replaced by removing the slide 16 and disconnecting the coupling 14, after which a section 24 may be inserted, whereupon the coupling 14 is reconnected and the slide 16 is replaced with the block 26 fitting the eccentric 25. The slide 16 is readily removed and replaced, it merely being necessary to loosen the screws 30, shift the plates 31 laterally, and pull out or insert the slide 16, the head 65 readily slipping out or entering the recess 66 and the stem slipping out of or entering the slot 68. A wide range of throws may be provided by having different eccentricities for eccentrics of the same diameter.

Referring now to the shear modification, the holder 54 is held in place with respect to the ram 32 by the screw 84. The holder has a recess 122 for a shear tool 123 held in place by screws 124. The shear tool 123 co-operates with a shear block 125 carried by the block 58. A table 126 is arranged adjacent to the upper end of the block 125. The block 125 is preferably cylindrical, whereby, without changing the direction of movement of the blank, the holder 32 may be turned by the handle 46 so as to follow a curved or desired line. By holding the blank, the shear tool may be moved about the block 125 to shear out a circular opening of the same size as the block. Blocks 125 of different diameters may be provided in order to cut out different sized openings. If the size of shear block is changed, the shear tool 123 is suitably adjusted, the clearance space or recess 122 being sufficient for this purpose and the screws 124 holding the tool in adjusted position. The use of the round block 125 with a shear tool movable thereabout makes it possible to cut along irregular or curved lines even though the work may not be capable of being turned in the throat space of the machine.

In Figs. 18 and 19, I show blocks 125a having polygonal portions 125b providing a plurality of shear faces 125c for cooperation with the shear tool 123. With this form, the blank must be turned to change the direction; however, the holder may be turned for cooperation with any of the faces.

From the foregoing, it will be apparent that I have devised a metal cutting machine capable of being operated either as a nibbling machine or as a shear together with improved nibbling and shearing arrangements. The machine is provided with a gag normally biased to a position between the tool holder and its actuating block or crosshead. The machine is furthermore provided with means for angularly adjusting the tool and with stripping means, whereby the tool may be turned and work be done without obscuring the portion of the stock being cut by the stripper.

The novel tool features disclosed but not claimed herein are claimed in my application Serial No. 318,283, filed Nov. 9, 1928. The shear embodiment disclosed herein is claimed in my application Serial No. 376,418, filed July 6, 1929, Patent No. 1,795,303, March 10, 1931.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a punch or shearing machine, the combination with a die, of a ram having punch or shear holding means, a removable slide for reciprocating the ram, guiding means for said slide, removable retaining means for the slide which affords access to the slide, a removable eccentric co-operating with the slide to reciprocate said slide, driving means, and a detachable coupling connecting the eccentric and the driving means, whereby the eccentric may be removed when the slide is removed to permit a different eccentric to be substituted to change the amplitude of reciprocation of the ram.

2. In a punch or shearing machine, the combination with a die, of a ram having punch or shear holding means, a removable slide for reciprocating the ram, guiding means for said slide, removable retaining means for the slide which affords access to the slide, a removable shaft having an eccentric which co-operates with the slide, a driving shaft, and a detachable coupling connectting the said shafts, whereby the eccentric and its shaft may be bodily removed as a unit when the slide is removed, to permit a different shaft and eccentric to be substituted to change the amplitude of reciprocation of the ram.

3. In a punching or shearing machine, the combination with a die, of a ram having punch or shear holding means, a removable slide for reciprocating the ram, guiding means for said slide, removable retaining means for the slide which affords access to the slide, a removable shaft having an eccentric which co-operates with the slide, a driving shaft coaxially mounted in respect to the foregoing shaft, said shafts having their inner ends in juxtaposition, and a removable coupling connecting the juxtaposed ends of said shafts whereby the eccentric and its shaft may be bodily removed as a unit when the slide is removed to permit a different shaft and eccentric to be substituted to change the amplitude of reciprocation of the ram.

4. In a machine of the character described, a guide member having a cylindrical bore and a peripheral bearing surface, a reciprocatory ram fitting the bore, a sleeve member encompassing said bearing surface, means for turning the sleeve member, means for connecting the sleeve member and the ram for angular movement together while permitting of reciprocatory movement of the ram relatively to the sleeve member, a movable cutting member carried by the ram, and a fixed cutting member cooperating with the movable cutting member.

5. In a cutting machine, a frame having substantially horizontal upper and lower arms, a guide member connected to the upper arm and having a vertical cylindrical bore and a peripheral bearing surface below the connection, a reciprocatory ram fitting the bore, a sleeve member encompassing said bearing surface and carried by the guide member, means for turning the sleeve member, a slidable key connection between the sleeve member and the ram, a movable cutting member carried by the ram, and a fixed cutting member carried by said lower arm and cooperating with the movable cutting member.

6. In a cutting machine, a frame having upper and lower arms, a guide member integral with the upper arm and having a cylindrical guide bore, a crosshead guide above the guide member and integral with the frame, a ram fitting said bore and turnable in the latter, a movable cutting member carried by the ram, a fixed cutting member carried by the lower arm and cooperating with the movable cutting member, means for turning the ram, a swivel head connected to the ram, a crosshead fitting the crosshead guide and provided with a recess for the swivel head of greater depth than the latter, a gag carried by the crosshead and movable into position between the top of the swivel head and the bottom of said recess and removable from that position, and means for reciprocating the crosshead.

7. In a cutting machine, a frame having upper and lower arms, a guide member integral with the upper arm and having a cylindrical guide bore, a crosshead guide above the guide member and integral with the frame, a ram fitting said bore and turnable in the latter, a movable cutting member carried by the ram, a fixed cutting member carried by the lower arm and cooperating with the movable cutting member, means for turning the ram in the bore and providing for relative reciprocatory movement of the ram, a swivel head connected to the ram, a crosshead fitting the crosshead guide and provided with a recess for the swivel head of greater depth than the latter, a gag carried by the crosshead, a spring for moving the gag into position between the top of the swivel head and the bottom of the recess, means for retracting the gag, means for moving the ram in a backstroke direction when the gag is retracted, and means for reciprocating the crosshead.

8. In a cutting machine, a frame having upper and lower arms, a guide member integral with the upper arm and having a cylindrical guide bore, a crosshead guide above the guide member and integral with the frame, a ram fitting the bore and turnable in the latter, a movable cutting member carried by the ram, a fixed cutting member carried by the lower arm and cooperating with the movable cutting member, means for turning the ram in the bore and providing for relative reciprocatory movement of the ram, a swivel head connected to the ram, a crosshead fitting the crosshead guide and provided with a recess for the swivel head of greater depth than the latter, a gag carried by the crosshead, a spring for moving the gag into position between the top of the swivel head and the bottom of the recess, means for retracting the gag, biasing means for raising the ram as soon as permitted by retraction of the gag, means for depressing the ram in opposition to its biasing means so that the gag may move into place between the swivel head and the bottom of the recess, and means for reciprocating the crosshead.

9. In a cutting machine, a frame having upper and lower arms, a guide member integral with the upper arm and having a cylindrical guide bore, a crosshead guide above the guide member and integral with the frame, a ram fitting said bore and turnable in the latter, a movable cutting member carried by the ram, a fixed cutting member carried by the lower arm and cooperating with the movable cutting member, means for turning the ram in the bore and providing for relative reciprocatory movement of the ram, a cylindrical swivel head connected to the ram and having upper and lower abutment surfaces, a crosshead fitting the crosshead guide, means on the crosshead provided with an abutment surface for abutment with the lower surface of the swivel head, a gag carried by the crosshead and having an abutment surface for abutment with the upper abutment surface of the swivel head and an end surface for abutment with the swivel head cylindrical surface, means for moving the gag to bring its abutment surface into cooperation with the swivel head upper abutment surface, means for retracting the gag, means carried by the crosshead for raising the ram and its swivel head when the gag is retracted, and means for limiting such raising movement to maintain the gag end surface abutting the swivel head cylindrical surface.

10. In a cutting machine, a frame having upper and lower arms, a guide member integral with the upper arm and having a cylindrical guide bore, a cross head guide above the guide member and integral with the frame, a ram fitting the bore and turnable in the latter, a movable cutting member carried by the ram, a fixed cutting member carried by the lower arm and cooperating with the movable cutting member, means for turning the ram in the bore and providing for relative reciprocatory movement of the ram, a swivel head having a shank threaded to the ram and provided with upper and lower abutment surfaces, and a crosshead fitting the crosshead guide and provided with upper and lower abutment surfaces for cooperation with the upper and lower abutment surfaces of the swivel head.

11. In a cutting machine, a frame having upper and lower arms; a guide member connected to the upper arm and having a cylindrical guide bore and a peripheral journal bearing surface; abutments at the upper and lower ends of the journal bearing surface; a reciprocatory ram fitting the bore; a sleeve member journalled on the journal bearing surface, held in place by said abutments, and including a plurality of arcuate sections; detachable means for securing the sections together; means for turning the sleeve member; means for transmitting angular movement from the sleeve member to the ram and providing for reciprocatory movement of the latter with respect to the former; a movable cutting member carried by the ram; and a fixed cutting member carried by the lower arm and cooperating with the movable cutting member.

12. In a cutting machine, the combination of a frame having an upper member provided with a vertical cross head guide and a lower member spaced from the upper member and having a cylindrical guide bore and a peripheral bearing surface, a reciprocatory cylindrical ram fitting the cylindrical guide bore, a sleeve member encompassing the bearing surface, means for turning the sleeve member, a slidable key connection between the sleeve member and the ram, a movable cutting member carried by the lower end of the ram, a fixed cutting member cooperating with the movable cutting member, the upper portion of said ram having a threaded bore, a crosshead fitting the crosshead guide and having a swivel recess, a swivel member having a swivel head turnably retained in the recess and having a threaded shank fitting the threaded bore of the ram, and locking means cooperating with the swivel shank and the ram to hold the shank and ram in adjusted position, said swivel shank and the locking means being accessible in the space between said upper and lower members for making axial adjustments of the ram.

13. In a machine of the character described, means providing a guide bore and a coaxial cylindrical bearing surface, a reciprocatory ram fitting the bore, a turnable member fitting the bearing surface, means for turning the turnable member, means for transmitting angular movement from the turnable member to the ram and providing for reciprocatory movement of the latter with respect to the former, a cutting tool carried by the ram and having a front cutting portion and a back pilot portion, the back pilot portion having lateral guide edges, a die cooperating with the tool, and a stripper carried by the turnable member and having stripping portion means disposed laterally of the pilot portion guide edges and exposing to view the forward cutting portion of the tool in all positions of angular adjustment of the latter.

In testimony whereof I affix my signature.

CHARLES B. GRAY.